United States Patent [19]

von Wichert et al.

[11] Patent Number: 4,585,503
[45] Date of Patent: Apr. 29, 1986

[54] HEAT-TREATMENT OF WRAPPERS IN CIGARETTE PACKING MACHINES AND THE LIKE

[75] Inventors: Nils von Wichert; Jürgen Steinhauer, both of Glinde, Fed. Rep. of Germany

[73] Assignee: Hauni-Werke Körber & Co. KG., Hamburg, Fed. Rep. of Germany

[21] Appl. No.: 540,798

[22] Filed: Oct. 11, 1983

[30] Foreign Application Priority Data

Oct. 12, 1982 [DE] Fed. Rep. of Germany ....... 3237687

[51] Int. Cl.⁴ ...................... B30B 15/34; B32B 35/00
[52] U.S. Cl. ........................................ 156/351; 53/75; 53/379; 156/358; 156/359; 156/567; 156/583.1
[58] Field of Search ............... 156/351, 358, 359, 366, 156/567, 583.1; 493/209; 53/234, 374, 375, 75, 76, 379

[56] References Cited

U.S. PATENT DOCUMENTS

| | | | |
|---|---|---|---|
| 3,616,052 | 10/1971 | Schwarzkopf | 156/366 |
| 3,692,611 | 9/1972 | Kuhnle | 156/358 |
| 3,979,881 | 9/1976 | Seragnoli | 156/583.1 |
| 3,984,963 | 10/1976 | Seragnoli | 156/583.1 |

*Primary Examiner*—Michael Wityshyn
*Attorney, Agent, or Firm*—Peter K. Kontler

[57] ABSTRACT

The heat-sealing tool for closing the thermoplastic transparent outer wrappers of cigarette packs in a cigarette packing machine is pivoted intermittently into engagement with the wrappers of successive packs while the indexible turret which transports the packs is idle. The tool is held in engagement with each of a series of wrappers for the same interval of time irrespective of the speed of the prime mover which drives the turret. To this end, the tool is pivotable by a rotary disc-shaped cam which is driven by a variable-speed motor whose operation is regulated by a control circuit including a function generator. Alternatively, the tool is actuated by a transmission which receives motion from the prime mover and is adjusted when the speed of the prime mover changes.

11 Claims, 6 Drawing Figures

HEAT-TREATMENT OF WRAPPERS IN CIGARETTE PACKING MACHINES AND THE LIKE

CROSS-REFERENCE TO RELATED CASE

The present invention is related to that which is disclosed in the commonly owned copending patent application Ser. No. 541,293 filed Oct. 12, 1983 by Nils von Wichert et al. for "Apparatus for intermittently actuating heating tools in packing machines", now U.S. Pat. No. 4,502,908 granted Mar. 3, 1985.

BACKGROUND OF THE INVENTION

The present invention relates to packing and analogous machines in general, and more particularly to improvements in heat-treatment of wrappers in such machines.

The invention will be described with reference to the making of cigarette packs with the understanding, however, that the invention can be embodied with equal advantage in machines for the packing or sealing of other types of commodities. A cigarette packing machine is often equipped or associated with a discrete apparatus or comprises an integral unit which serves to provide cigarette packs with outer envelopes or wrappers consisting of a transparent or translucent material. The flaps, tucks or other projecting parts of such outer wrappers must be bonded to each other in order to prevent accidental opening of packs in storage or during shipment. As a rule, the packs are introduced into the pockets of a turret or another suitable transporting device and are moved stepwise to a sealing station where a heated sealing tool engages the adjacent flap or tuck of the thermoplastic outer wrapper and bonds it to the neighboring flap, tuck or another portion of such wrapper. The arrangement is such that the sealing tool is moved into engagement with successive outer wrappers during successive intervals of idleness of the transporting device.

A drawback of presently known packing machines which are equipped with such sealing tools is that the means for moving the sealing tool into and from engagement with successive heat-sealable outer wrappers receives motion from the main prime mover of the machine. The speed of such prime mover must be varied for a number of reasons. This presents problems in connection with retention of the sealing tool in engagement with successive outer wrappers for requisite intervals of time. Thus, when the main prime mover is driven at an elevated speed, the intervals of engagement between the sealing tool and successive outer wrappers are shortened and this can result in the making of unsatisfactory bonds. On the other hand, when the main prime mover is decelerated, it is likely to retain the sealing tool in prolonged heat-transmitting engagement with successive outer wrappers so that the material of such wrappers is or is likely to be discolored, charred or burned. The situation is analogous when a heated tool is brought into contact with successive cigarette packs, cigarettes or other commodities for the sole purpose of rapidly expelling moisture from adhesive bonds, e.g., from seams between overlapping marginal portions of webs of cigarette paper, tipping paper or the like. In other words, the effective heating, sealing or drying time depends on the momentary speed of the main prime mover of the machine with attendant problems when the speed is increased or reduced to such an extent that the intervals of engagement between the heated tool and successive commodities are too short or too long. Since the speed of the main prime mover does vary, a certain number of commodities cannot be treated to an optimum extent because the intervals of engagement between the heat-transmitting tool and successive commodities are directly dependent upon the speed of the main prime mover. The speed of the main prime mover is normally less than the nominal (optimum) speed immediately after starting as well as when the machine is to be inspected for the purpose of detecting flaws in the operation of one or more components, such as the transporting device or devices for cigarette packs, wrapping paper, labels and/or other constituents of cigarette packs. At such times, the actual speed of the main prime mover is normally only half the nominal speed.

German Offenlegungsschrift No. 1,965,693 discloses an apparatus wherein the intervals of engagement between a heat-transmitting tool and successive commodities are regulated by a time-delay element which can control the flow of a fluid to a cylinder serving to adjust a lever which carries the tool. The apparatus of this German publication is intended for the making of plastic bags or similar receptacles. Its main drawback is that it cannot control the movements of the tool with requisite accuracy when the tool must be moved to or from its operative position as often as five-hundred times per minute, a requirement which must be met in a modern high-speed cigarette packing machine.

OBJECTS AND SUMMARY OF THE INVENTION

An object of the invention is to provide a machine, particularly a cigarette packing machine, with novel and improved means for effecting and controlling the movements of a heat-transmitting tool with a high degree of accuracy and reproducibility at frequencies which cannot be achieved in accordance with heretofore known proposals.

Another object of the invention is to provide a machine wherein changes in the speed of the main prime mover cannot influence the quality of the heating, sealing or drying action of a heated tool upon a succession of thermoplastic wrappers or other commodities.

A further object of the invention is to provide a machine wherein the tool can be moved into engagement with successive commodities as often as desired, for example, at least five-hundred times per minute, without risking damage to or destruction of the commodities.

An additional object of the invention is to provide a novel and improved method of uniformizing the intervals of dwell of a heated tool in engagement with successive commodities which are transported by a device receiving motion from a variable-speed prime mover.

Another object of the invention is to provide the machine with novel and improved means for pivoting a heated tool into and from engagement with the outer wrappers of successive cigarette packs or analogous block-shaped objects.

A further object of the invention is to provide the machine with a novel and improved drive for the means which actuates or displaces the heated tool.

An additional object of the invention is to provide a novel and improved control system for the just mentioned drive.

An ancillary object of the invention is to provide a novel and improved rotary cam for use in the above outlined machine.

Another object of the invention is to provide novel and improved means for controlling the movements of the cam with a heretofore unmatched degree of accuracy and reproducibility.

The invention is embodied in a machine for establishing connections between or for otherwise treating parts of wrappers or the like, particularly in a packing machine for processing cigarette packs having wrappers consisting of heat-sealable material. The machine comprises an indexible turret or other suitable means for intermittently transporting a succession of wrappers along a predetermined path at any one of a plurality of different speeds, a connection-establishing tool (e.g., an electrically heated welding tool) which is adjacent to a predetermined portion of the path, and novel and improved means for maintaining the tool in an operative position with reference to successive wrappers in the predetermined portion of the path for identical intervals of time during successive periods of idleness of the transporting means. Such maintaining means comprises displacing means (e.g., a rotary disc cam) which is actuatable to move the tool to the operative position with reference to the wrapper in the predetermined portion of the path, drive means (e.g., a variable-speed d-c motor and a transmission which is interposed between the output element of the motor and the cam) which is operable to actuate the displacing means, and control means for operating the drive means for identical intervals of time (independently of the speed of the transporting means) during successive periods of idleness of the transporting means. The cam comprises an actuating portion (e.g., a larger-diameter lobe extending along an arc of 240°) which is movable into engagement with the tool (e.g., with a roller follower on a lever which is pivotably mounted in the machine and carries the tool at a locus which is remote from the fulcrum) to thereby maintain the tool in the operative position, and the drive means can be operated by the control means to maintain the actuating portion of the cam in engagement with the tool for one of the aforementioned intervals during each revolution of the cam.

As mentioned above, the drive means can comprise a discrete prime mover (such as the aforementioned variable-speed d-c motor) for the displacing means, and the control means then comprises means for regulating the rotational speed of the discrete prime mover in accordance with a predetermined pattern which is not influenced by the speed of the main prime mover of the machine.

The control means preferably comprises means for braking the discrete prime mover, and such braking means (e.g., a signal generator which generates braking signals for transmission to a servo component which directly controls the discrete prime mover) can be activated by the displacing means, e.g., by a trip on the aforementioned rotary disc cam. The control means can further comprise an analog function generator which is designed to transmit signals from one or more signal generators to a servoamplifier including the aforementioned servo component which directly influences the discrete prime mover. One of several signal generators which form part of the control means and transmit signals to discrete inputs of a logic circuit for the function generator can monitor the main prime mover of the machine to generate an accelerating signal as soon as the transporting means is brought to a halt or is about to be halted, and such signal is used to effect abrupt acceleration of the discrete prime mover (and hence of the cam) from zero speed to a nominal or optimum speed. Another signal generator can be placed next to the cam and transmits a braking signal when the cam has completed a certain portion of a full revolution, namely, when the interval during which the tool is held in the operative position has elapsed or is about to elapse, whereby the discrete prime mover is rapidly decelerated, preferably close to zero speed. A further signal generator is preferably placed adjacent to the cam to generate a stop signal when the cam completes a full revolution, and such stop signal is used to effect immediate stoppage of the discrete prime mover subsequent to pronounced deceleration of such prime mover.

In accordance with another feature of the invention, the drive means comprises a carrier which is rotatable by the main prime mover of the machine (such main prime mover transmits motion to the transporting means) about a first axis (preferably about the axis of a driven shaft which supports the displacing means, such as a rotary disc cam), a link which is mounted on the carrier for rotation about a second axis which is parallel to the first axis, and guide means (e.g., a rocker) eccentrically mounted on the link for angular movement about a third axis which is parallel to the second axis. The control means includes means for changing the position of the third axis (of the guide means) with reference to the second axis and for thereby turning the link about the second axis. The link transmits motion to the displacing means. The position changing means can comprise an eccentric pin which mounts the rocker and is adjustable by a servomotor; the latter forms part of the control means and adjusts the eccentric pin in automatic response to changes in the speed of the main prime mover. The connection between the aforementioned driven shaft and the link preferably includes a gear train, e.g., a pair of mating gear segments.

In accordance with an additional feature of the invention, the displacing means comprises a rotary cam and the drive means includes means for rotating the cam clockwise and counterclockwise. Such cam preferably includes first and second portions each of which is arranged to effect a movement of the tool from its operative position, and the control means of such machine comprises first and second signal generators each of which is arranged to generate a signal which initiates a deceleration of the drive means when the tool is acted upon by the respective cam portion. The control means further comprises a third signal generator which is actuatable by the cam and serves to generate signals which effect stoppage of the drive means. The cam preferably further comprises a portion (such as a pronounced auxiliary lobe) which serves to effect a movement of the tool from operative position when the machine is idle.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
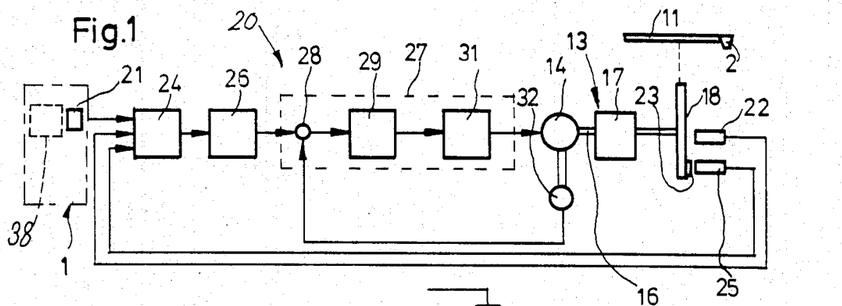
FIG. 1 is a diagrammatic view of a machine which embodies one form of the invention and wherein the displacing means for the sealing tool includes a rotary disc cam which is driven by a variable-speed d-c motor.
Figures 2, 3:
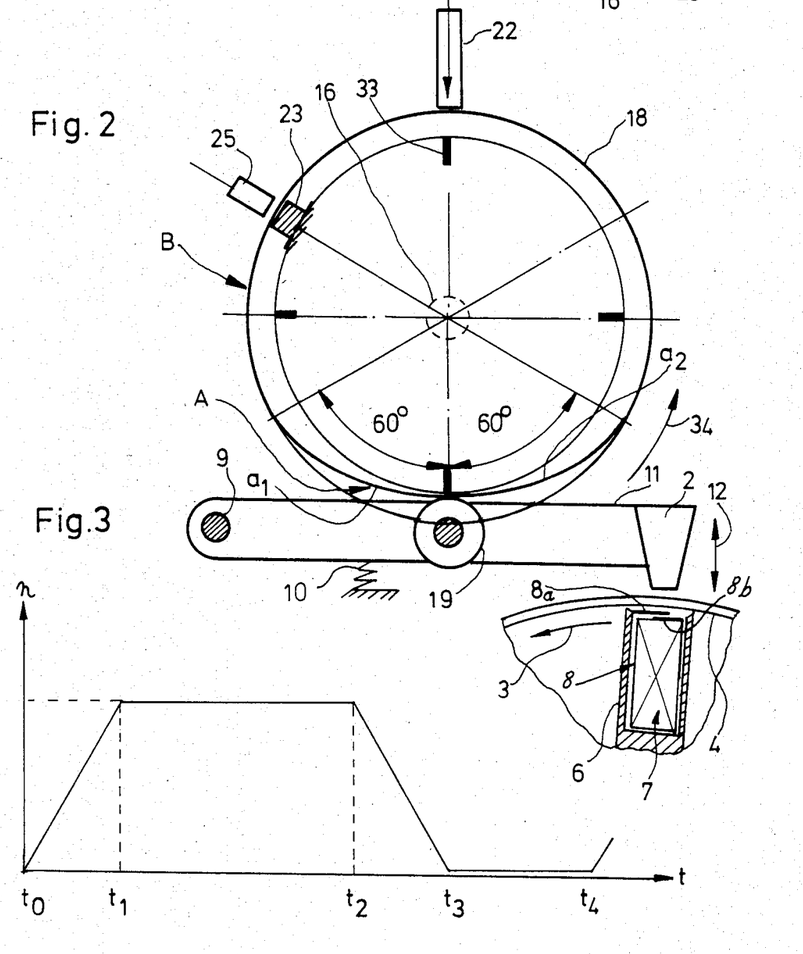
FIG. 2 is a fragmentary partly sectional view of the transporting device for cigarette packs and an elevational view of the sealing tool and of the disc cam, with the disc cam shown in its starting position.
FIG. 3 is a time-RPM diagram of the variable-speed motor for the disc cam.

FIGS. 1 and 2 illustrate certain portions of a cigarette packing machine 1 which includes means for applying to cigarette packs 7 outer wrappers 8 consisting of a heat-sealable synthetic thermoplastic material such as polypropylene. The overlapping flaps 8a and 8b of successive wrappers 8 are bonded to each other by a heated sealing tool 2 which forms part of or is separably secured to a one-armed lever 11 fulcrumed in the machine frame at 9. The tool 2 is adjacent to the path of movement of a succession of cigarette packs 7 which are confined in the pockets 6 of a transporting device in the form of an indexible turret 4. The means for indexing the turret 4 in the direction of arrow 3 so that successive packs 7 come to a halt at a sealing station which accommodates the sealing tool 2 comprises a main prime mover 38, e.g., a variable-speed electric motor which, in addition to the turret 4, preferably also drives nearly all other mobile components of the packing machine. A packing machine which can embody, or which can be equipped with, the sealing tool 2 of the present invention is disclosed, for example, in commonly owned Kruse et al U.S. Pat. No. 3,956,870 granted May 18, 1976.

In presently used cigarette packing machines, the duration of successive working cycles is determined by the momentary speed of the main prime mover. Thus, if the speed of the main prime mover is increased, the length of each period of dwell of a pack 7 at the sealing station accommodating the sealing tool 2 is also reduced. Were the tool 2 of FIGS. 1 and 2 actuated by the main prime mover 38, the duration of its contact with the flaps 8a of successive wrappers 8 would be reduced in response to acceleration of the main prime mover with attendant danger that the bond between the flaps 8a and 8b would be unsatisfactory. Inversely, if the speed of the main prime mover 38 is reduced, the duration of each period of dwell of the turret 4 is increased and, if the tool 2 were actuated directly by the main prime mover 38, the intervals of contact between the tool 2 and the flaps 8a of successive wrappers 8 would increase accordingly with attendant danger of charring and discoloration or outright burning of the wrappers.

The lever 11 for the sealing tool 2 is biased in a counterclockwise direction, as viewed in FIG. 2, by a coil spring 10 which tends to move the tool 2 from an operative position to the inoperative or retracted position which is shown in FIG. 2 and in which the tool 2 cannot interfere with indexing movements of the turret 4. A suitable indexing mechanism which can be used to rotate the turret 4 through angles of desired magnitude is shown, for example, in FIG. 8 of the aforementioned commonly owned Kruse et al U.S. Pat. No. 3,956,870. The coil spring 10 reacts against a stationary portion of the frame of the packing machine 1 and maintains a roller follower 19 on the lever 11 in permanent contact with the periphery of a rotary disc cam 18 which constitutes a means for displacing the tool 2, namely, for moving the tool 2 to the aforementioned operative position during each interval of idleness or dwell of the turret 4. The lever 11 is pivotable in directions which are indicated by the arrow 12, either under the action of the coil spring 10 or in response to rotation of the disc cam 18.

In accordance with a feature of the invention, the means for operating the cam 18 so that the latter can actuate the sealing tool 2 independently of the main prime mover 38 (except that the actuation of the cam 18 for the purpose of moving the tool 2 to its sealing or operative position invariably takes place while the turret 4 is idle) comprises a discrete drive 13 which includes a variable-speed direct-current motor 14, e.g., a motor of the type known as disc armature or pancake motor. The output shaft 16 of the motor 14 transmits torque to the cam 18 through the medium of a step-down transmission 17. The cam 18 includes a raised portion or lobe B which extends along an arc of 240° and a smaller-diameter portion A whose end portions merge gradually into the lobe B and which extends along an arc of 120°.

The control means 20 for operating the drive means 13 including the motor 14 and the transmission 17 comprises the following components: A first signal generator 21 is adjacent to the main prime mover 38 of the packing machine 1 and serves to generate signals for rapid acceleration of the motor 14 (and hence of the disc cam 18) from zero RPM to the nominal RPM (see the diagram of FIG. 3) when it detects that condition or stage of the main prime mover 38 during which the turret 4 is idle or is about to come to a halt so that a fresh pack 7 is located or is about to be located at the sealing station adjacent to the tool 2. The signal generator 21 can constitute a conventional proximity switch which can respond to movement of a portion of the indexing mechanism for the turret 4 to a predetermined position which is indicative of the fact that the turret 4 has been brought to a halt or is about to be arrested.

A second signal generator 22 (e.g., a proximity switch) of the control means 20 is adjacent to the periphery of the disc cam 18 and generates a signal when approached by a trip 23 on the disc cam. Such signal initiates abrupt deceleration of the motor 14 and cam 18 as soon as the prescribed interval of sealing engagement between the tool 2 and a flap 8a has elapsed or is about to elapse. The signal which is generated by the signal generator 22 can be said to constitute a braking signal because it entails abrupt or rapid deceleration of the motor 14. A third signal generator 25 is also adjacent to the periphery of the disc cam 18 and can be actuated by the aforementioned trip 23 to generate a "stop" or "arrest" signal for the motor 14 and cam 18, i.e., to bring the cam 18 to a full stop subsequent to abrupt deceleration of the motor 14 in response to generation of a signal by the proximity detector switch 22. The construction of the signal generator 25 may but need not be identical with that of the signal generator 21 or 22, i.e., the signal generator 25 can also constitute a commercially available proximity switch.

The outputs of the signal generators 21, 22 and 25 transmit corresponding signals to the respective inputs of a logic circuit 24 wherein the conductors transmitting accelerating, braking and stop signals are interconnected (by suitably logic elements in the form of AND— OR—, NO— or other gates) in such a way that the output of the circuit 24 transmits a signal whenever one of its inputs receives a signal, i.e., that the transmission of the accelerating signal is terminated when the signal generator 22 transmits a braking signal, that the transmission of the braking signal is terminated when the signal generator 25 transmits a stop signal, that the transmission of the stop signal is terminated when the signal generator 21 transmits an accelerating signal, and so forth. The signals which appear at the output of the logic circuit 24 are transmitted to an analog function generator circuit 26. The latter stores an accelerating signal until it receives a braking signal, the braking signal is stored until the function generator circuit 26 receives a stop signal for the motor 14, and so on. The analog function generator circuit 26 may be of the type known as POS E2GN which is manufactured and sold by the firm Hauser, Oberschöpfheim, Federal Republic Germany. The output of the circuit 26 transmits signals to a four-quadrant servo amplifier 27 which includes a substracting circuit 28, an RPM regulator circuit 29 and a servo component 31. The amplifier 27 may be of the type known as SV 3510 which is also manufactured and sold by Hauser.

The d-c motor 14 is connected with a tachometer generator 32 whose output transmits signals to the subtracting circuit 28, and such signals denote the monitored RPM of the motor 14. The motor 14 and the tachometer generator 32 are available as a unit under the designation E 670 MGB (manufactured and sold by the firm BAUTZ, Darmstadt, Federal Republic Germany).

FIG. 3 shows a curve which denotes the speed of the motor 14 and cam 18 during a working cycle, i.e., during a period of time which elapses for maintaining the turret 4 in a state of idleness for an interval which is dependent upon the speed of the main prime mover 38 and for indexing the turret 4 by a step. The interval of idleness of the turret 4 between two successive indexing movements is invariably longer than the interval which is required to properly seal a wrapper 8 by maintaining the tool 2 in the operative position of contact with the flap 8a (whereby the tool 2 urges the flap 8a against the respective flap 8b). The time t is measured along the abscissa and the RPM ($\eta$) of the motor 14 is measured along the ordinate of the coordinate system of FIG. 3.

The operation of the machine which embodies the structure of FIGS. 1 and 2 is as follows:

When the main prime mover 38 is in the process of indexing the turret 4 by a step, the disc cam 18 is held in a predetermined angular (starting) position in which a zero index or marker 33 of this cam in is accurate register with the signal generator 22. At such time, the roller follower 19 contacts the central zone of the peripheral surface of the cam portion A, namely, the zone which is nearest to the axis of the cam 18 so that the latter enables the coil spring 10 to expand and to maintain the tool 2 in the illustrated inoperative position in which the tool cannot interfere with indexing of the turret 4. When the indexing of the turret 4 is completed, the turret maintains a fresh cigarette pack 7 with an unsealed envelope 8 thereon in an optimum position with reference to the sealing tool 2. Stoppage of the indexing operation induces the signal generator 21 to transmit a signal to the logic circuit 24 which transmits an appropriate signal to the subtracting circuit 28 of the amplifier 27 via function generator circuit 26. The generation of an accelerating signal takes place at the instant $t_o$ (refer to the diagram of FIG. 3). The setting of the function generator circuit 26 determines the nature of the reference signal which is transmitted to the corresponding input of the subtracting circuit 28. As can be readily ascertained by referring to FIG. 3, the accelerating signal which is generated by the signal generator 21 entails an abrupt acceleration of the motor 14 during the interval between the instants $t_o$ and $t_1$ so that the RPM of the motor 14 is rapidly increased from zero to the nominal value which is denoted by the horizontal portion of the curve. The nominal RPM of the motor 14 is selected in advance, the same as the interval between the instants $t_1$ and $t_2$ during which the nominal RPM of the motor 14 remains unchanged to thus ensure that the period of engagement between the sealing tool 2 and the adjacent flap 8a is the optimum period for ensuring the making of a satisfactory bond between the flaps 8a and 8b.

The RPM of the motor 14 (and hence the peripheral speed of the disc cam 18) is actually regulated by the amplifier 27. The peripheral speed of the disc cam 18 is less than the peripheral speed of the output shaft 16 because the cam receives torque from the output element of the step-down transmission 17.

When the cam 18 is set in motion (starting from the neutral position which is shown in FIG. 2), it rotates in a counterclockwise direction (note the arrow 34) so that the radially outwardly sloping branch $a_1$ of its portion A gradually pivots the lever 11 in a clockwise direction through the medium of the roller follower 19 whereby the sealing tool 2 moves toward and assumes its operative position when the follower 19 begins to track the portion B of the cam 18. The turret 4 is then idle and the wrapper 8 of a pack 7 is in an optimum position for engagement between its flap 8a and the sealing tool 2. The cam 18 completes an angular movement through 60° during the interval (between $t_o$ and $t_1$) which is required to accelerate the motor 14 from zero RPM to the nominal RPM. The RPM of the motor 14 is thereupon constant (during the interval between $t_1$ and $t_2$) while the tool 2 is in sealing engagement with the adjacent flap 8a, i.e., the interval between $t_1$ and $t_2$ is always the same irrespective of the speed of the main prime mover 38 and irrespective of the speed at which the turret 4 is indexed by the main prime mover 38. The disc cam 18 rotates through an angle of 240° during the interval between $t_1$ and $t_2$ (engagement between the follower 19 and cam portion B) whereupon the follower 19 begins to track the branch $a_2$ of the cam portion A with attendant movement of the sealing tool 2 away from the adjacent flap 8a.

The trip 23 advances past the signal generator 22 at the instant $t_2$ so that the latter generates a braking signal which entails rapid deceleration of the motor 14 between $t_2$ and $t_3$ before the trip 23 reaches the signal generator 25 (at the instant $t_3$) to bring about complete stoppage of the cam 18 at the exact moment when the zero index 33 is in register with the signal generator 22. The roller follower 19 begins to track the branch $a_2$ of the cam portion A when the logic circuit 24 receives a signal from the signal generator 22, and the cam 18 comes to a halt, in response to a signal from the signal generator 25, upon completion of an angular movement through 60° (this is the interval between the instants $t_2$ and $t_3$). The spring 10 ensures that the sealing tool 2 begins to move away from the adjacent flap 8a as soon as the roller follower 19 begins to track the branch $a_2$ of the cam portion A.

It will be noted that the signal generator 25 generates a stop signal at a time (instant $t_3$) when the RPM of the motor 14 is well below the nominal RPM. This ensures that the motor 14 can be arrested at the exact moment when the zero index 33 is in register with the signal generator 22. In other words, when the logic circuit 24 receives a signal from the signal generator 25, such signal is processed by the amplifier 27 to arrest the motor 14 while the RPM of this motor is already low. Therefore, the starting position of the cam 18 is always the same, i.e., the cam 18 is arrested in an angular position in which the zero index 33 registers with the signal generator 22. This contributes to uniformity of the intervals during which the sealing tool 2 is in contact with successive wrappers 8 because the roller follower 19 always engages the median zone of the cam portion A when the turret 4 is in motion.

The function generator circuit 26 is adjustable so that it can furnish any one of a number of different values for the reference signal which is transmitted to the corresponding input of the subtracting circuit 28 in the amplifier 27. Such adjustability of the function generator circuit 26 renders it possible to select an optimum RPM curve for the variable-speed d-c motor 14. The amplifier 27 ensures that such curve is maintained while the tool 2 treats each of a short or long series of envelopes 8, as long as the adjustment of the circuit 26 remains unchanged.

When the sealing operation upon an envelope 8 at the sealing station is completed, the tool 2 dwells in the retracted position of FIG. 2 while the turret 4 is indexed by a step during the interval which elapses between the instants $t_3$ and $t_4$. The instant $t_4$ corresponds to the instant $t_o$. The sealing operation begins anew when the next envelope 8 is moved to the sealing station. It goes without saying that the illustrated turret 4 can be replaced with other transporting means which can advance a succession of wrappers 8 along a predetermined path so that a wrapper is always located in the path portion which is adjacent to the sealing tool when the transporting means is brought to a halt.

An advantage of drive means which employs a disc-armature d-c motor is that the mass which must be accelerated or decelerated is small and, therefore, such acceleration or deceleration can be completed within very short periods of time.

Figure 4:
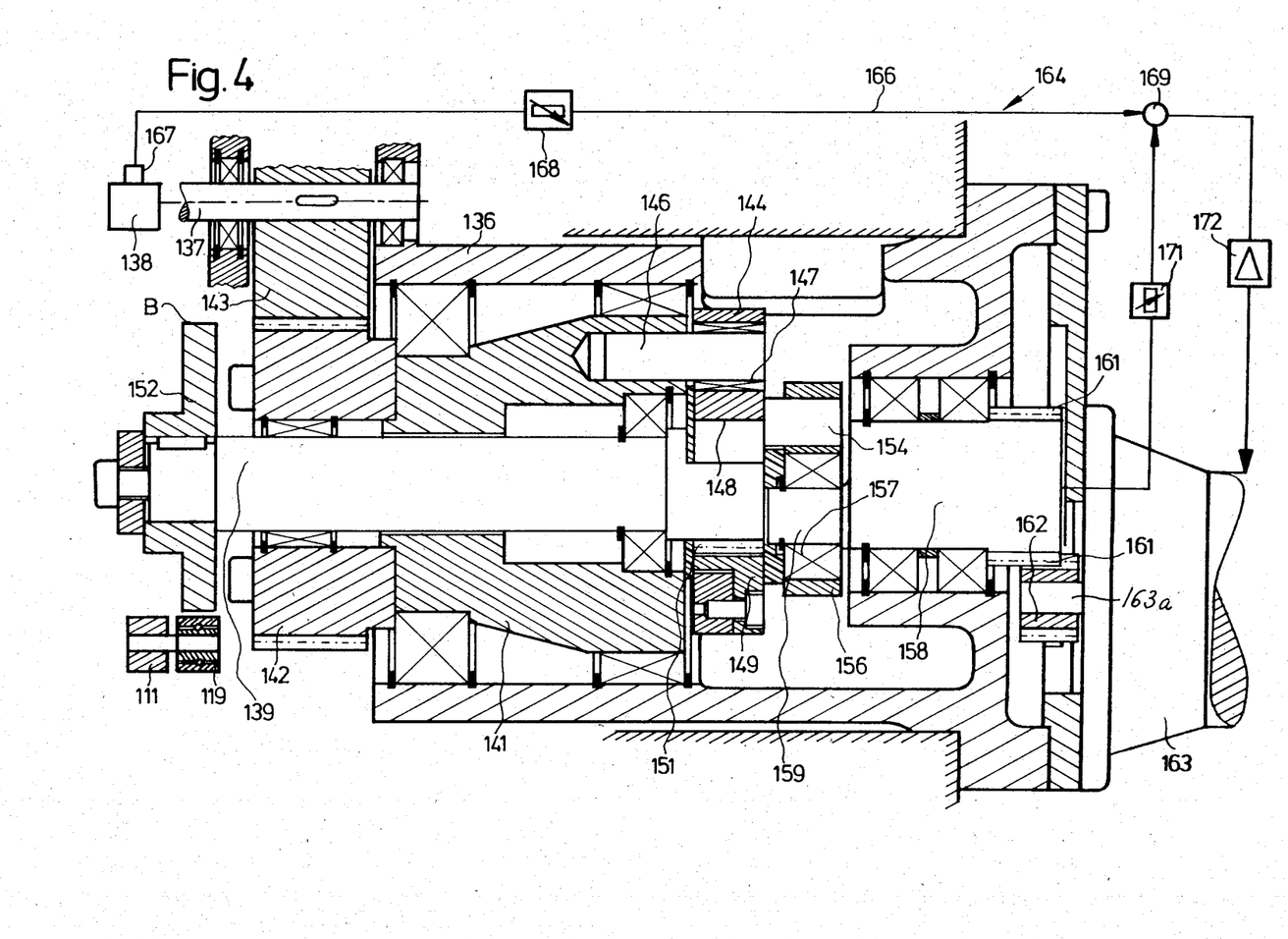
FIG. 4 is a partly schematic and partly sectional view of a portion of a second machine with modified drive means for the displacing means and with a modified control system for the drive means.
Figure 5:
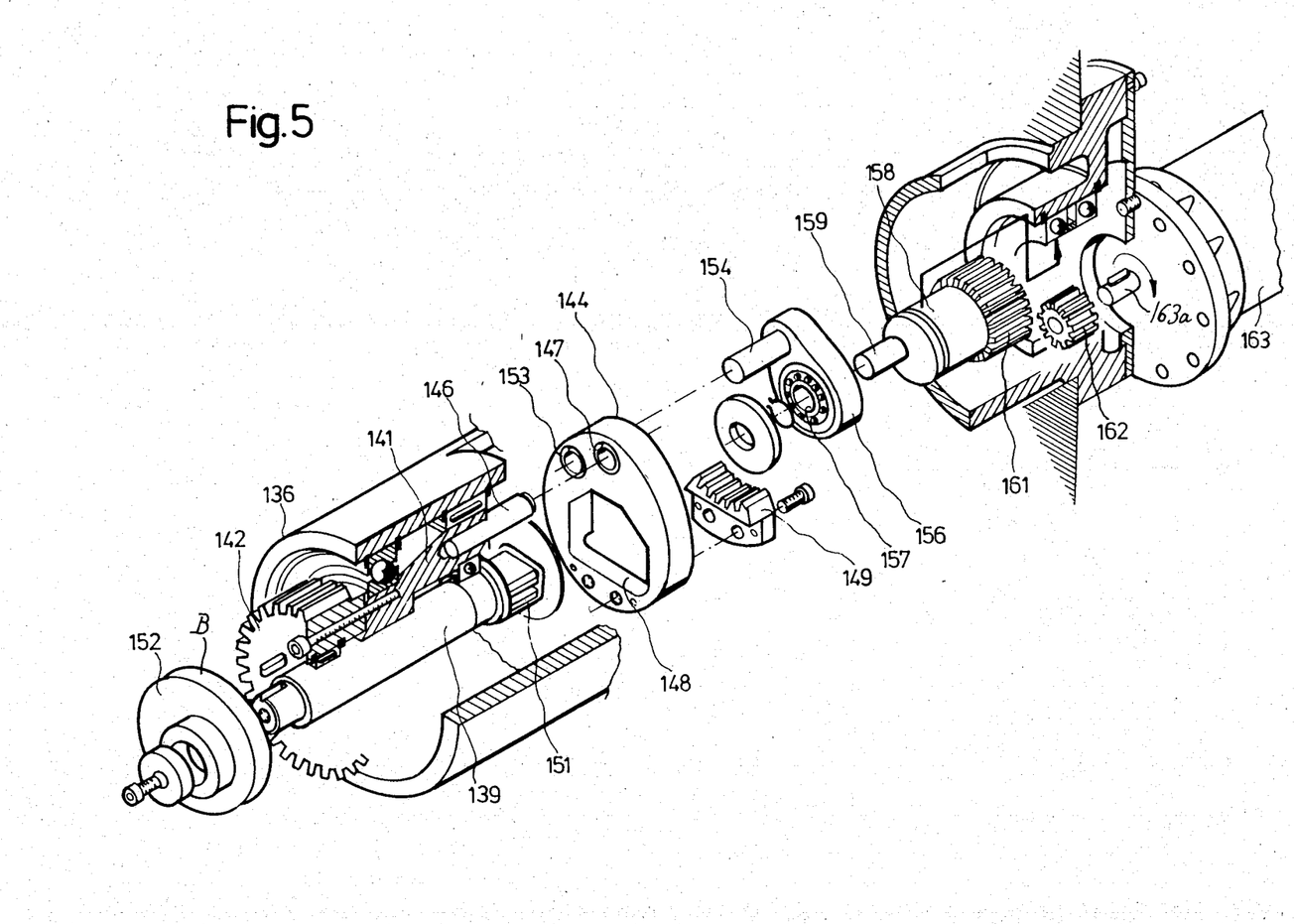
FIG. 5 is a smaller-scale exploded perspective view of the structure which is shown in FIG. 4.

FIGS. 4 and 5 illustrate a portion of a modified packing machine wherein the main prime mover 138 transmits torque to an input shaft 137 which is rotatably mounted in a housing 136. An output shaft 139 is rotatably mounted in the housing 136 in parallelism with the input shaft 137 and defines an axis of rotation for a carrier 141 which is rigidly connected to or made integral with a spur gear 142. The latter meshes with a spur gear 143 which is rigidly connected to or made integral with the input shaft 137 so that this shaft drives the carrier 141. The carrier 141 has an eccentrically mounted pin 146 which is parallel to the shafts 137, 139 and extends into the eccentric needle bearing 147 of a link 144. This link has a cutout 148 for a gear segment 149 in mesh with a gear segment 151 on the output shaft 139. The gear segment 149 is secured to the link 144 by screws, bolts or analogous fasteners. That end portion of the output shaft 139 which is remote from the gear segment 151 is rigidly connected with a disc cam 152 which performs the function of the disc cam 18 shown in FIG. 2. It will be seen that an end portion of the output shaft 139 extends from the housing 136 and that such exposed end portion carries the disc cam 152. FIG. 4 shows that the periphery of the disc cam 152 is tracked by a roller follower 119 which is mounted on a lever 111 corresponding to the lever 11 of FIGS. 1–2 and carrying the sealing tool.

The link 144 is provided with a second needle bearing 153 for a pin 154 which is mounted at one end of a guide member in the form of a rocker 156. An anti-friction ball bearing 157 of the rocker 156 surrounds a servo component in the form of an eccentric crank pin 159 on a shaft 158 whose axis is parallel to that of the output shaft 139. The shaft 158 carries a ring gear 161 in mesh with a pinion 162 which is mounted on the output shaft 163a of a servomotor 163. The housing of the servomotor 163 is bolted or otherwise rigidly secured to the housing 136.

The control means 164 of the machine embodying the structure of FIGS. 4 and 5 includes the servomotor 163 and a tachometer generator 167 which monitors the speed of the main prime mover 138 and transmits corresponding signals via conductor means 166 containing an adjustable potentiometer 168. The output of the potentiometer 168 is connected with one input of a subtracting circuit 169 (signal comparing stage) another input of which is connected with the output of a signal generator 171 which generates signals denoting the angular positions of the pin 159 with reference to the axis of the shaft 158. The output of the subtracting circuit 169 is connected with an amplifier 172 which controls the operation of the servomotor 163.

The mode of operation of the structure which is shown in FIGS. 4 and 5 is as follows:

The variable-speed main prime mover 138 of the packing machine drives the input shaft 137 which drives the carrier 141 through the medium of the gear train 143, 142. When the main prime mover 138 is operated at a constant speed, the speed of the shaft 137 and carrier 141 is also constant. The eccentric bearing pin 146 then drives the link 144 at a constant angular velocity and in the same direction, and the gear segments 149, 151 rotate the output shaft 139. The link 144 further transmits torque to the rocker 156 through the medium of the pin 154 which extends into the needle bearing 153. The direction of rotation of the rocker 156 coincides with that of the link 144. Depending on the selected angular position of the eccentric crank pin 159 with reference to the axis of the shaft 158 (the crank pin 159 carries the rocker 156), the rocker 156 is accelerated and decelerated during each of its revolutions as a function of adjustment of the crank pin 159 by the servomotor 163 which, in turn, is adjusted by the control means 164. Such acceleration and deceleration of the rocker 156 are superimposed upon the link 144 as additional oscillatory movements so that the constant-speed angular movement of the link 144 is changed into a movement which is accelerated during a first stage and decelerated during a second stage of rotation of the pin 146 about the axis of the output shaft 139. This entails a corresponding angular movement of the gear segments 149, 151 relative to each other so that the output shaft 139 for the disc cam 152 is accelerated and decelerated for the same purpose as described in connection with acceleration and deceleration of the cam 18 of FIG. 2. Thus, the disc cam 152 is accelerated and decelerated as a function of momentary speed of the main prime mover 138 in such a way that the cam portion B (which holds the sealing tool on the lever 111 in operative position) maintains the sealing tool in engagement with the adjacent wrapper for the same interval of time irrespective of the speed of the main prime mover 138.

When the speed of the main prime mover 138 is changed, the tachometer generator 167 transmits a corresponding signal to the potentiometer 168 whose output transmits an appropriate signal to the subtracting circuit 169 which further receives a signal denoting the angular position of the crank pin 159. The output of the circuit 169 then transmits a signal to the servomotor 163 which changes the angular position of the crank pin 159 via gear train 162, 161 and shaft 158 so that the interval of retention of the sealing tool in the operative position is again the same even though the speed of the main prime mover 138 has been changed. Thus, the crank pin 159 ensures that the acceleration and deceleration of the disc cam 152 are changed whenever the speed of the main prime mover 138 changes with the result that the interval of retention of the sealing tool in its operative position is the same for each and every speed of the main prime mover 138. The intervals of idleness of the transporting means for the wrappers should be long enough to ensure that the transporting means for the cigarette packs is idle while the sealing tool dwells in its operative position irrespective of whether the main prime mover 138 is operated at a maximum speed, at a minimum speed or at an intermediate speed between the maximum and minimum speeds. In other words, the intervals during which the portion B of the cam 152 acts upon the roller follower 119 to maintain the lever 111 and the sealing tool thereon in operative position are always the same, irrespective of the selected speed of the main prime mover 138.

The intervals of dwell of the sealing tool in the operative position are selected and can be altered by the adjustable potentiometer 168.

An advantage of the structure which is shown in FIGS. 4 and 5 is that the drive means for the tool need not employ a discrete prime mover, i.e., the cam 152 derives motion from the variable-speed main prime mover 138 of the packing machine. The changes in speed of the main prime mover 138 entail changes in oscillatory movements of the rocker 156 with the result that the duration of engagement between the portion B of the disc cam 152 and the roller follower 119 on the lever 111 for the tool remains unchanged. The output shaft 139 (which carries the cam 152) is accelerated when the speed of the main prime mover 138 decreases and vice versa.

It is possible to modify the structure of FIGS. 1-2 or the structure of FIGS. 4-5 by employing a cam which defines a closed track for the roller follower 19 or 119, e.g., by resorting to a cylinder cam. The same system could be employed in lieu of the rocker 156 and crank pin 159. The rocker 156 is preferred at this time.

Figure 6:
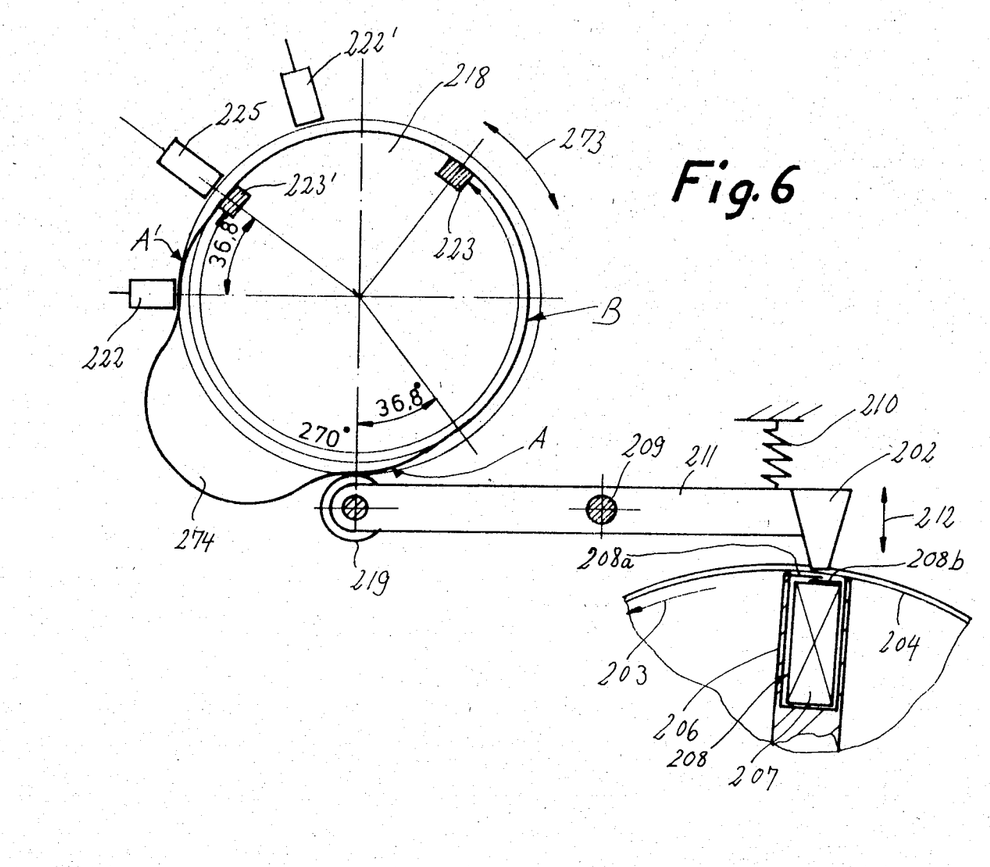
FIG. 6 is a view similar to that of FIG. 2 but showing a modified disc cam which actuates the sealing tool.

FIG. 6 illustrates a portion of a packing machine which constitutes a modification of the machine shown in FIGS. 1 and 2. All such parts which are identical with or clearly analogous to the corresponding parts of the machine of FIGS. 1-2 are denoted by similar reference characters plus 200. The lever 211 of FIG. 6 is a two-armed lever which is fulcrumed in the machine frame at 209 and the right-hand arm of which carries the sealing tool 202. The left-hand arm of the two-armed lever 211 carries the roller follower 219 which tracks the periphery of a modified disc cam 218. The coil spring 210 reacts against the housing of the packing machine and bears against the right-hand arm of the lever 211 to maintain the roller follower 219 in uninterrupted contact with the periphery of the cam 218 (unless the roller follower 219 is lifted off the cam 218 while the tip of the sealing tool 202 engages the adjacent flap 208a of the wrapper 208 at the sealing station.

The cam 218 comprises a portion or section B which engages the roller follower 219 while the sealing tool 202 is maintained in the operative position, and two additional portions or sections A and A' which are engaged by the roller follower 219 while the sealing tool 202 is held out of the operative position. The cam 218 is further provided with two discrete trips 223 and 223' which respectively cooperate with the signal generators 222, 222' of the control means. The signal generators 222, 222' generate braking signals when they are respectively approached by the trips 223, 223'. Each of the trips 223, 223' can cause the signal generator 225 to generate a stop signal for the motor which drives the disc cam 218.

In contrast to the mode of operation of the structure which is shown in FIGS. 1 and 2, the disc cam 218 of FIG. 6 is first rotated clockwise (as viewed in FIG. 6) through an angle of 270° and is thereupon rotated through an angle of 270° but in a counterclockwise direction while the cam portion B engages the roller follower 219 to maintain the sealing tool in contact with the flap 208a of a wrapper 208 at the sealing station to complete a full first cycle during clockwise rotation and thereupon complete a second cycle during counterclockwise rotation. The directions of rotation of the disc-cam 218 in clockwise and counterclockwise directions are indicated by the double-headed arrow 273.

In order to avoid damage to wrappers 208 during prolonged idleness of the turret 204 (as a result of overheating of flaps 208a, 208b by the continuously heated sealing tool), the disc cam 218 is provided with a pronounced auxiliary lobe 274 which is caused to engage the roller follower 219 when the signal generator 222 transmits a stop signal whereby the sealing tool 202 is held at such a distance from the path of movement of the packs 207 and wrappers 208 that the tool cannot overheat the adjacent wrapper even if the turret 204 remains at a standstill for any selected or required interval of time. Thus, the distance between the sealing tool 202 and a wrapper 208 at the sealing station is less pronounced in normal operation than at the time when the roller follower 219 is engaged by the auxiliary lobe 274 of the disc cam 218.

An important advantage of the improved machine is that changes in the speed of the main prime mover cannot adversely influence the action of the tool upon successive wrappers. This is especially important when the speed of the main prime mover is reduced because, in the absence of any remedial action, such reduction of the speed of the main prime mover would entail a longer-lasting contact between the tool and successive wrappers with the result that the tool would discolor, char or otherwise damage the wrappers. The improved machine ensures that the intervals of heat transfer between the tool and successive wrappers are entirely independent of the speed of the main prime mover irrespective of whether the displacing means (such as the cam 18, 152 or 218) is actuated by a discrete prime mover (14) or receives motion from the main prime mover (138).

Another important advantage of the improved machine is that it is effective during each and every stage of operation, i.e., when the speed of the main prime mover is reduced to a minimal value, when such speed is increased to a maximal value, as well as when the speed is anywhere between the minimal and maximal values.

Still another important advantage of the improved machine is that the sealing, heating or drying action of the tool is satisfactory when the machine turns out up to and in excess of five-hundred packs per minute, i.e., at a machine speed which is too high if the heat-transmitting tool is actuated by conventional displacing means.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In a machine for securing parts of wrappers or the like to each other, particularly in a packing machine for processing cigarette packs having wrappers of heat-sealable material, the combination of means for intermittently transporting a succession of wrappers along a predetermined path at any one of a plurality of different speeds; a securing tool adjacent to a predetermined portion of said path; and means for maintaining said tool in an operative position with reference to successive wrappers in said portion of said path for identical intervals of time during successive periods of idleness of said transporting means, comprising displacing means actuatable to move said tool to the operative position with reference to a wrapper in said portion of said path, said displacing means comprising a rotary cam, drive means operable to actuate said displacing means, and control means for operating said drive means independently of the speed of said transporting means during successive perids of idleness of said transporting means, said control means comprising a plurality of signal generators arranged to generate signals for influencing said drive means and an analog function generator having input means connected with said signal generators and output means connected to said drive means, said drive means comprising a variable-speed motor and said signal generators including a signal generator arranged to generate a stop signal in a predetermined position of said displacing means and to thereby effect a stoppage of said motor by way of said function generator, said signal generators including a further signal generator arranged to generate a decelerating signal in a predetermined angular position of said cam and to thereby effect a reduction of the speed of said motor by way of said function generator during each revolution of said cam prior to generation of the stop signal.

2. The combination of claim 1, wherein said cam has an actuating portion which is movable into engagement with said tool to thereby maintain the tool in said operative position.

3. The combination of claim 1, wherein said motor is direct-current motor.

4. The combination of claim 1, wherein said cam is a disc cam and said motor comprises an output shaft, said drive means further comprising a transmission interposed between said output shaft and said cam.

5. The combination of claim 1, further comprising variable-speed main prime mover means for said transporting means, said signal generators including a third signal generator arranged to generate signals denoting the condition of said main prime mover means.

6. The combination of claim 5, wherein said function generator is arranged to increase the speed of said motor in response to a signal from said third signal generator.

7. In a machine for securing parts of wrappers or the like to each other, particularly in a packing machine for processing cigarette packs having wrappers of heat-sealable material, the combination of means for intermittently transporting a succession of wrappers along a predetermined path at any one of a plurality of different speeds; a variable-speed main prime mover for said transporting means; a securing tool adjacent to a predetermined portion of said path; and means for maintaining said tool in an operative position with reference to successive wrappers in said portion of said path for identical intervals of time during successive periods of idleness of said transporting means, comprising displacing means actuatable to move said tool to the operative position with reference to a wrapper in said portion of said path, drive means operable to actuate said displacing means, said drive means comprising a carrier rotatable about a first axis, a link mounted on said carrier for rotation about a second axis parallel to said first axis, and guide means eccentrically mounted on said link for angular movement about a third axis which is parallel to said second axis, and control means for operating said drive means for identical intervals of time independently of the speed of said transporting means during successive periods of idleness of said transporting means, said control means including means for changing the position of said third axis with reference to said second axis and for thereby turning said link about said second axis, said displacing means being arranged to receive motion from said link.

8. The combination of claim 7, wherein said guide means comprises a rocker and said position changing means including an eccentric pin mounting said rocker.

9. The combination of claim 8, wherein said control means further comprises a servomotor for adjusting said eccentric pin and means for operating said servomotor in response to changes in the speed of said main prime mover.

10. The combination of claim 7, further comprising a shaft defining said first axis and a gear train between said shaft and said link.

11. The combination of claim 10, wherein said gear train comprises mating gear segments.

* * * * *